3,484,491
METHOD FOR MANUFACTURING PARA-CHLOROPHENOL
Ken Ito and Hiroshi Kaminaka, Toyonaka-shi, Takaki Hamada, Takatsuki-shi, and Hiroshi Kuruma, Takarazuka-shi, Japan, assignors to Sumitomo Chemical Company, Ltd., Osaka, Japan, a corporation of Japan
No Drawing. Filed May 31, 1966, Ser. No. 553,670
Claims priority, application Japan, July 8, 1965, 40/41,139
Int. Cl. C07c 39/28, 37/02
U.S. Cl. 260—623    5 Claims

ABSTRACT OF THE DISCLOSURE

Para-chlorophenol is prepared from phenol by a series of steps wherein the phenol is first reacted with phosphorus trichloride in an aromatic organic solvent to form phenyl phosphite, oxidizing the phenyl phosphite at a temperature up to 100° C. with an oxidizing agent such as hydrogen peroxide or persulfuric acid. The phenyl phosphate is reacted directly with chlorine, preferably in a solvent medium such as acetic acid or carbon tetrachloride in the presence of a chlorination catalyst such as ferric chloride or iodine. As a final step, the chlorinated phenyl phosphate is hydrolyzed in aqueous medium with caustic soda or an acid, such as hydrochloric acid, and the chlorophenol product recovered therefrom. The yield in each step is substantially quantitative with an overall yield of about 95% based upon the phenol starting material. Alternatively, the phenyl phosphate intermediate may be prepared by direct reaction of the phenol with phosphorous oxy-chloride in the presence of a catalyst such as aluminum trichloride.

---

This invention relates to a process for producing para-chlorophenol.

Para-chlorophenol is a valuable compound which is used widely as a raw material for making quinizarin, a dye intermediate, or agricultural chemicals.

There have been known various methods for manufacturing para-chlorophenol. Direct chlorination of phenol with chlorine, chlorination of phenol with sulfuryl chloride, diazotization of para-chloroaniline followed by hydrolysis, diazotization of para-aminophenol followed by chlorination, and hydrolysis of para-dichlorobenzene carried out at a superatmospheric pressure were the known methods. Of these methods, the direct chlorination of phenol was seemed to be most advantageous. However, it was almost impossible to produce only one of para-chlorophenol and ortho-chlorophenol selectively, though it was known that if the reaction temperature is lowered, the para-chloro-compound is produced increasingly, while if it is elevated, on the contrary, the ortho-chloro-compound is produced increasingly. For example, when phenol was subjected directly to the action of chlorine after it was cooled to 0° C. using such a solvent as carbon disulfide possessing very low freezing point, the para-chloro- and the ortho-chloro-compounds were produced in almost equal quantities and moreover di-chloro- and tri-chloro-compounds were by-produced in substantial quantities and the object of the production of para-chlorophenol could not be attained. Accordingly, it cannot be helped to say that this method is inadequate for the commercial purpose.

Thus the method of using sulfuryl chloride much more expensive than chlorine, has been used for manufacturing para-chlorophenol commercially.

Further, many efforts have been made to manufacture monochlorophenols at a low cost. As a result, there was proposed a method for manufacturing para-chlorophenol by isopropylating chlorobenzene or chlorinating isopropylbenzene to yield para-chlorocumene, oxidizing para-chlorocumene to yield para-chlorocumene hydroperoxide, and then decomposing the resulting para-chlorocumene hydroperoxide. This is advantageous for the manufacture on a large scale but a relatively high equipment cost is required for meeting the present demand and therefore it can not be said to be economical. Still further there has been proposed also a method for manufacturing para- or ortho-chlorophenol selectively by chlorinating phenol with low-cost chlorine after a suitable substituent like sulfon group was inserted to the ortho- or the para-position of phenol to be chlorinated, and then eliminating the introduced substituent. But this method also is not yet satisfactory.

The present inventors took up and studied a novel method for changing the reactivity of the phenol nucleus by converting a hydroxyl group of phenol into its ester of a suitable type and then chlorinating it directly with chlorine.

Acids useful for esterifying phenol, include such organic acids as acetic acid, propionic acid, malonic acid, adipic acid, benzoic acid and phthalic acid, and such inorganic acids as phosphoric acid, phosphorous acid, arsenic acid, boric acid and carbonic acid. But first of all the influence of ester on the reactivity of phenol nucleus as the prime factor, difficulty or easiness of esterification, that of hydrolysis of the ester after chlorination and the possibility of smooth supply of the acid and its price from a commercial point of view, must be taken into consideration.

As the result of studying from the above-mentioned standpoints, the present inventors have found that the phosphoric acid ester of phenol satisfies best the purpose. Thus it has been established a novel process for manufacturing para-chlorophenol by chlorinating phosphoric acid ester of phenol.

One object of the present invention is to provide a novel process for producing para-chlorophenol selectively in commercial scale at low cost. Other objects will be apparent from the following description.

In order to accomplish these objects the present invention provides a novel process for producing parachlorophenol, which comprises converting phenol into phenyl phosphate, chlorinating the resulting triphenyl phosphate with chlorine to form chlorophenyl phosphate, and hydrolyzing the resulting chlorophenyl phosphate.

According to the process of the present invention, phenol is first converted into its phosphoric acid ester or phenyl phosphate. This is an easy reaction. Since phosphoric acid is a trivalent acid, 3 moles of phenol can be esterified with one mole of phosphoric acid. Compared with such a monovalent acid as acetic acid, the quantity of its consumption per mole of phenol is smaller. This can be said to be one of its commercial advantages. Next, the phenyl phosphate is subjected to action of chlorine with or without solvent. In this case, a catalyst may be or may not be used. Then chlorinated phenyl phosphate is hydrolyzed to obtain chlorinated phenol. The yield is above 90%. The polychloro-compounds are produced only by less than 1%, hence scarcely offering problems. With regard to the monochloro-compound, it has been found such an interesting fact as that the selectivity to the para-chloro-compound is 80–95%.

As those which are the esterified and hydrolyzed easily like phenyl phosphate from the commercial viewpoint, acetic acid and phosphorous acid ester of phenol can be mentioned. But such a high selectivity to para-chlorophenol as has been recognized in the case of phenyl phosphate cannot be seen in the case of these compounds, in which a considerable amount of ortho-chloro-compound is by-produced and by-production of dichloro-compound also cannot be surpressed.

The detail of the present invention will be explained in accordance with the order of step of reaction as follows:

There have been various methods for the production of the phenyl phosphate, of which any can be adopted. One of the commercial methods is to react phenol directly with phosphorous trichloride to make the phosphorous acid ester of phenol, or phenyl phosphite, which is then oxidized to obtain the phosphoric acid ester or phenyl phosphate. A second one is to react phosphorus oxychloride with phenol in the presence of a catalyst such as aluminum chloride to obtain phosphoric acid ester or phenyl phosphate. Either of them may be employed, of which the yield is above 95%.

More particularly, in the first method, phenol is reacted with phosphorus trichloride at a temperature ranging from 70° to 150° C. to form phenyl phosphite. The reaction proceeds easily and quantitatively without any catalyst and is finished within a relatively short period of time such as for example 1 to 2 hours.

As a reaction medium such solvent as toluene, xylene, halogenated benzene may be used. The thus obtained phenyl phosphite is oxidized to form phenyl phosphate. The oxidation reaction is effected generally at a temperature ranging from room temperature to 100° C. As the oxidizing agent hydrogen peroxide, nitrogen oxide, sulfuric acid, persulfuric acid, vanadium oxide, and barium oxide may be employed. The yield of oxidation reaction reaches 97% at maximum.

In the second method, phenol is reacted with phosphorus oxychloride at a temperature ranging from 60° to 200° C. in the presence of a catalyst to form phenyl phosphate. As the catalyst aluminum trichloride, magnesium chloride, zinc chloride, phosphorus pentachloride and magnesium oxide may be employed, among which aluminum trichloride is most generally used. The reaction is generally conducted without any solvent, and may be finished within a period of time ranging from 2 to 6 hours. The amount of catalyst may be within a range of from 0.5 to 5% by weight based on the weight of phenol.

Next, phenyl phosphate is chlorinated with chlorine in the presence or absence of solvent. In case of no solvent phenyl phosphate is melted and then subjected directly to action of chlorine. In this case, however, the temperature of reaction naturally reaches above the melting point (50° C.) of phenyl phosphate, and with the advancement of reaction it reaches finally above that of chlorinated phenyl phosphate. Hence it is necessary to elevate a temperature above 110° C. to effect the reaction, that is, the reacion temperature is elevated more than necessary. Therefore it is more advantageous to carry out the reaction in the presence of a solvent. A solvent customarily used in chlorination such as acetic acid, carbon tetrachloride or carbon disulfide can be employed in this case. The quantity of its use is ½–10 times, preferably 2–3 times by weight based on the weight of phenyl phosphate.

The reaction temperature of chlorination varies depending on the kind of solvent to be used but can be selected freely within a range of from −10° C. to 100° C. The reaction is continued until the generation of hydrogen chloride gas is ceased, and generally reaction period of time is within a range of from 1 to 10 hours.

As a catalyst for chlorination, the following are generally used: ferric chloride, aluminum trichloride, antimony chloride, phosphorus chloride, sulphur chloride, bromine, iodine, sulphur, active carbon and activated clay. All of them can be used in the present reaction but iodine gives an especially good result. The quantity of its use is 0.1–5%, usually 0.5–3% by weight based on the weight of phenyl phosphate. The yield of the chlorination is above 95%.

Lastly chlorinated phenyl phosphate is hydrolyzed. The hydrolysis can be carried out with use of an acidic or an alkaline catalyst.

The acids which can be used in the acidic hydrolysis are inorganic ones such as hydrochloric acid, phosphoric acid and sulfuric acid. It is suitable to use such an acid in a concentration of 5–30%, preferably 10–20% by weight. That is, when one of the aids in a concentration within the above-mentioned range is added to chlorinated phenyl phosphate in a quantity of 2–3 times by weight based on the weight of chlorinated phenyl phosphate and heated at 90°–150° C. for 15–25 hours, the hydrolysis completes. When the resultant product is left cooling, an oily layer of chlorophenol separates at the bottom. It is washed, distilled or crystallized out to obtain the aimed product.

When phenyl phosphate is produced using phosphorus trichloride or phosphorus oxychloride, hydrogen chloride is generated. Hence if water is used to absorb it and resultant hydrochloric acid is used as an acid for the hydrolysis, needless to say, it is advantageous in the point of effective use of by-product and reduction of production cost.

In the case of the alkaline hydrolysis, a 10–30% aqueous solution of caustic soda, caustic potash, soda ash or potassium carbonate is employed. When one of them together with chlorinated phenyl phosphate is heated at about 90°–150° C. for 15–25 hours, similarly to the case of acidic hydrolysis, the reaction completes. In this case, however, since chlorophenol becomes an alkali salt and is dissolved in water, it is necessary to precipitate chlorophenol by adding an acid after the hydrolysis is finished.

Further hydrolysis reaction may be conducted under pressure. Hydrolysis is conducted under acidic or alkaline condition and under pressure at a temperature of from 120° to 150° C. to obtain similar result as obtained under atmospheric pressure. In this case reaction period of time is shortened to 3 to 6 hours. The temperature higher than 150° C. is not preferred because it gives bad effect to the quality of chlorophenol.

Both in the cases of acidic and alkaline catalysts the yield of the hydrolysis is quantitative, excepting the handling loss.

The product, monochlorophenol is obtained through the above-mentioned processes. The yield based on the starting material, phenol is more than 90% at the minimum, usually the value of 95% is maintained while, on the other hand, the by-production of polychloro-compounds is of negligible quantities. The production ratio of the para-chloro-compound and the ortho-chloro-compound in monochlorophenol varies depending on the conditions of the reaction but reaches 80/20–95/5. Namely, the yield of para-chlorophenol to the starting material phenol reaches 76–90%.

The method of the present invention has a more number of steps than a method using sulfuryl chloride. However, since phosphorus trichloride and phosphorus oxychloride are being manufactured abundantly and used at a low cost now for producing phosphoric acid esters, and the quantity of their use is only by one third to one equivalent of phenol, and even if chlorine used for chlorination is taken into account in addition to it, the method of the present invention is much more advantageous than the conventional method which must use one equivalent of very expensive sulfuryl chloride to one equivalent of phenol. This advantage makes up more than sufficiently for its disadvantage of an increased number of steps.

The present invention may be more fully understood from the following examples which are given by way of illustration but it is not intended to limit the invention. Parts are by weight.

EXAMPLE 1

3 parts of aluminum trichloride was added to 285 parts of phenol. While the mixture was being maintained at about 70° C., 153 parts of phosphorus oxychloride was dropped thereto. After the dropping finished, the mixture was maintained at a temperature of 100° to 120° C. for two hours and further it was maintained at the same temperature for one hour, while nitrogen gas was blown to drive off hydrogen chloride from the reaction system and to complete esterification reaction. Then the reaction liquid was distilled at a reduced pressure and separated from unreacted phenol and the residue to afford 316.5 parts of phenyl phosphate. The yield was 97%.

163 parts of phenyl phosphate thus obtained was dissolved in 490 parts of carbon tetrachloride and after addition of 5 parts of iodine as a catalyst, chlorine gas was blown into the solution for 3 hours while the solution was being maintained at a temperature of 75°–80° C. Next, nitrogen gas was blown into it to remove unreacted chlorine and hydrochloric acid remaining in the reaction system. Further carbon tetrachloride was removed by distillation, whereby about 215 parts of chlorinated phenyl phosphate was obtained. After 500 parts of 10% hydrochloric acid was added, it was hydrolyzed by heating it at a temperature of 100°–110° C. for 25 hours. After the reaction finished, it was left cooling to separate into two layers, chlorophenol forming the lower of them. The chlorophenol was separated, washed and distilled, whereby 163.8 parts of para-chlorophenol and 19.2 parts of ortho-chlorophenol were obtained. The distillation residue presumably consisting of polychlorophenol was about 1 part.

The production ratio of para-chlorophenol and ortho-chlorophenol was 89.5:10.5. The yield of para- and ortho-chlorophenyl based on phenyl phosphate and based on the starting material, phenol, were 95% and 92% respectively.

EXAMPLE 2

217 parts of phenyl phosphate which had been obtained by the same procedure as in Example 1 was dissolved in 500 parts of carbon disulfide. After 4 parts of ferric chloride, as a catalyst, was added, chlorine gas was blown into the solution for four hours, while the latter was being maintained at about 5° C. Next, after the solvent was removed, 650 parts of 20% solution of caustic soda was added, and the mixture was heated at a temperature of 120°–140° C. under pressure for four hours to complete the hydrolysis. After cooled, the hydrolyzed solution was neutralized with hydrochloric acid thereby to separate an oily layer consisting of chlorophenol. The chlorophenol thus obtained was washed and dried, whereby 188 parts of crude chlorophenol was obtained. By analyzing the product by way of gas-chromatography, it was found that the production ratio of para-chlorophenol and ortho-chlorophenol was 92:8 and besides, the by-production of the polychloro-compounds was observed in an amount of 0.4%.

EXAMPLE 3

94 parts of phenol was maintained at about 70° C. while stirring. 45.8 parts of phosphorus trichloride was added dropwise thereto over a period of 1 hour. After several minutes from the start of the dropping generation of hydrogen chloride gas was observed. After the dropping was finished the reaction mixture was maintained at a temperature ranging from 130° to 150° C. for about 3 hours, while in the last 1 hour dry air was blown into the reaction mixture to remove hydrogen chloride out of the reaction system thereby to ensure the completion of the reaction. After reaction, the reaction mixture was distilled at a reduced pressure to yield 100 parts of phenyl phosphite.

31 parts of the thus obtained phenyl phosphite was dissolved in 200 parts of tertiary butaneol. Thereto was dropped a tertiary butanol solution of 30% hydrogen peroxide. As the dropping proceeded, the reaction temperature increased and finally reached reflux. After dropping was finished, reflux was continued for additional 30 minutes to complete the reaction. Upon distilling off the solvent, phenyl phosphate was obtained at 95% yield based on phenyl phosphite. The thus obtained phenyl phosphate was chlorinated and then hydrolyzed in similar way as in Example 1 to obtain similar result as in Example 1.

What we claim is:

1. In a process for the production of para-chlorophenol wherein phenol is converted to triphenyl phosphate, chlorinating the triphenyl phosphate to form chlorotriphenyl phosphate and then hydrolyzing the chlorotriphenyl phosphate to produce para-chlorophenol, the improvement comprising chlorinating the triphenyl phosphate by treatment with chlorine at a temperature ranging from −10° C. to 100° C. in the presence of a catalyst selected from the group consisting of ferric chloride, aluminum trichloride, antimony chloride, phosphorus chloride, sulfur chloride, bromine, iodine, sulfur, active carbon and active clay.

2. The method according to claim 1 in which the amount of the catalyst is 0.5–3% by weight based on the weight of the triphenyl phosphate.

3. The method according to claim 1 in which the chlorination is conducted in a solvent medium selected from the group consisting of acetic acid, carbon tetrachloride and carbon disulfide.

4. The method according to claim 3 in which the ratio of the solvent to the triphenyl phosphate is from 0.5:1 to 10:1, by weight.

5. The method according to claim 3 in which the amount of solvent is from 0.5 to 10 times by weight that of the triphenyl phosphate.

References Cited

UNITED STATES PATENTS

| | | | |
|---|---|---|---|
| 3,215,722 | 11/1965 | Krueger | 260—623 |
| 2,078,421 | 4/1937 | Schman | 260—986 |
| 2,725,394 | 11/1955 | Zenftman | 260—983 |
| 3,205,251 | 9/1965 | Mitchell | 260—975 |
| 3,270,091 | 8/1966 | Spivack | 260—623 |

OTHER REFERENCES

Rosenmund et al.: "Chem. Abs.," vol. 51 (1957), p. 6534.

Arbuzov et al.: Izvestiya Akademii Nauk SSR (1958), Nr. 1, pp. 171–172 (USSR).

Groggins: "Unit Processes in Organic Synthesis," pp. 265–267, 752–757, 205–207, 178–179, 229–230.

BERNARD HELFIN, Primary Examiner

W. B. LONE, Assistant Examiner

U.S. Cl. X.R.

260—975, 976, 986